(12) United States Patent
Felts

(10) Patent No.: US 7,404,073 B2
(45) Date of Patent: Jul. 22, 2008

(54) TRANSITIONING FROM STARTUP CODE TO APPLICATION CODE DURING INITIALIZATION OF A PROCESSOR BASED DEVICE

(75) Inventor: Wayne Lawrence Felts, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 663 days.

(21) Appl. No.: 10/606,090

(22) Filed: Jun. 26, 2003

(65) Prior Publication Data

US 2004/0268115 A1  Dec. 30, 2004

(51) Int. Cl.
*G06F 15/177* (2006.01)
(52) U.S. Cl. .................... 713/100; 713/1; 713/2
(58) Field of Classification Search ............... 713/100
See application file for complete search history.

(56) References Cited

U.S. PATENT DOCUMENTS

| | | | |
|---|---|---|---|
| 4,130,769 A | 12/1978 | Karube | |
| 4,169,990 A | 10/1979 | Lerdman | |
| 4,405,885 A | 9/1983 | Okamoto | |
| 4,531,079 A | 7/1985 | Muller | |
| 4,631,459 A | 12/1986 | Fujioka et al. | |
| 4,633,150 A | 12/1986 | Inaji et al. | |
| 4,712,050 A | 12/1987 | Nagasawa et al. | |
| 4,742,282 A | 5/1988 | Okutani et al. | |
| 4,748,386 A | 5/1988 | Nakanishi et al. | |
| 4,888,533 A | 12/1989 | Gotoh et al. | |
| 4,896,807 A | 1/1990 | Mundschau | |
| 4,926,101 A | 5/1990 | Enomot et al. | |
| 4,992,710 A | 2/1991 | Cassat | |
| 5,001,405 A | 3/1991 | Cassat | |
| 5,010,283 A | 4/1991 | Kitajima et al. | |
| 5,028,852 A | 7/1991 | Dunfield | |
| 5,117,165 A | 5/1992 | Cassat et al. | |
| 5,159,246 A | 10/1992 | Ueki | |
| 5,166,583 A | 11/1992 | Min et al. | |
| 5,184,038 A | 2/1993 | Matsui et al. | |
| 5,189,574 A | 2/1993 | Imamura et al. | |
| 5,254,914 A | 10/1993 | Dunfield et al. | |
| 5,274,310 A | 12/1993 | Bahn | |
| 5,285,135 A | 2/1994 | Carobolante et al. | |
| 5,298,839 A | 3/1994 | Takeda | |
| 5,334,917 A | 8/1994 | Lind | |
| 5,343,127 A | 8/1994 | Maiochhi | |
| 5,378,976 A | 1/1995 | Inaji et al. | |
| 5,397,972 A | 3/1995 | Maiocchi | |

(Continued)

*Primary Examiner*—Nitin C Patel
(74) *Attorney, Agent, or Firm*—David K. Lucente

(57) ABSTRACT

Method and apparatus for initializing a processor based device having a processor that controls an electrical load, such as a motor. The electrical load is initially operationally controlled using startup code executed by the processor. Processor control of the electrical load is next temporarily released so that the electrical load operates in an open control mode while the startup code is displaced with application code during a "brain transplant" operation. Processor operational control of the electrical load is thereafter resumed using the application code and the device is placed in an operational ready mode. The apparatus preferably comprises a data storage device and the electrical load preferably comprises a spindle motor configured to rotate a data storage medium on which the application code is stored, as well as an actuator motor which supports a data transducing head used to access the application code.

20 Claims, 6 Drawing Sheets

U.S. PATENT DOCUMENTS

| | | |
|---|---|---|
| 5,428,276 A | 6/1995 | Carobolante et al. |
| 5,541,488 A | 7/1996 | Bansal et al. |
| 5,631,999 A | 5/1997 | Dinsmore |
| 5,703,449 A | 12/1997 | Nagate et al. |
| 5,777,448 A | 7/1998 | Matsui |
| 5,780,983 A | 7/1998 | Shinkawa et al. |
| 5,841,252 A | 11/1998 | Dunfield |
| 5,870,363 A | 2/1999 | Sun et al. |
| 5,929,577 A | 7/1999 | Neidorff et al. |
| 5,963,706 A | 10/1999 | Baik |
| 5,982,119 A | 11/1999 | Okada et al. |
| 5,982,571 A | 11/1999 | Calfee et al. |
| 5,998,946 A | 12/1999 | Kim |
| 6,078,158 A | 6/2000 | Heeren et al. |
| 6,160,367 A | 12/2000 | Higashi et al. |
| 6,405,311 B1 * | 6/2002 | Broyles et al. ................ 713/2 |
| 2002/0167287 A1 * | 11/2002 | Heydt et al. ................ 318/254 |
| 2004/0003223 A1 * | 1/2004 | Fortin et al. .................... 713/1 |
| 2004/0019776 A1 * | 1/2004 | Sato et al. ...................... 713/1 |
| 2004/0078679 A1 * | 4/2004 | Cagle et al. .................. 714/36 |

* cited by examiner

TRANSITIONING FROM STARTUP CODE TO APPLICATION CODE DURING INITIALIZATION OF A PROCESSOR BASED DEVICE

FIELD OF THE INVENTION

This invention relates generally to the field of processor based devices and more particularly, but not by way of limitation, to a method and apparatus for transitioning between startup code and application code during initialization of a processor based device.

BACKGROUND

Programmable processors continue to be increasingly used in a wide variety of consumer goods and commercial equipment. A processor based device commonly includes a processor and a memory in which application code is stored. During operation, the processor executes programming steps of the application code to control the operation of the device.

Advantages of the use of programmable processors over hardwired logic circuits include reductions in cost, ease of manufacturability, and the ability to make subsequent modifications to the application code to enhance functionality without the need to modify device hardware/mechanical configurations.

A processor based device can be initialized (turned on and made ready for operation) using startup code provided from a boot random access memory (ROM) or other memory location. The startup code enables the processor to prepare the device for normal operation, including such steps as activating various components of the device, loading the application code, etc. The processor transitions from execution of the startup code to the application code to finalize the initialization process.

When the device includes an electrical load (such as a motor) that is controlled by the processor, it is sometimes desirable that the startup code include steps to initiate operational control of the load and then hand off the control of the load to the application code.

For example, in systems that require some amount of elapsed time to prepare the load for operation (e.g., a laser or other light source, a capacitive load, etc), initiating operation of the electrical load before the application code is fully loaded may reduce the overall time to place the device in an operational ready state.

In some types of devices it is necessary to activate the electrical load in order to be able to access the application code. For example, in data storage devices the application code can be stored on a data storage medium that is rotated by a motor and accessed by a data transducing head. In such systems the startup code includes programming steps to activate the motor and the head to retrieve the application code from the medium.

Transitioning between startup code and application code while maintaining operational control of an electrical load of a device can be a complex operation. Such handoffs can be carried out in stages, whereby portions of both the application code and the startup code are sequentially executed. The processor "jumps" back and forth between the startup code and the application code, so that the startup code is gradually phased out as the application code fully takes over.

Such phasing in of the application code can add to the overall initialization time, as well as increase the difficulty in upgrading the application code since there is a danger that the upgraded application code may not handshake properly with the startup code during the initialization process.

Thus, while various approaches to transitioning between startup code and application code can be used, there nevertheless remains a continued need for improvements that carry out such handoffs in an efficient and effective manner. It is to such improvements that the present invention is directed.

SUMMARY OF THE INVENTION

As embodied herein and as claimed below, the present invention is generally directed to a method and apparatus for initializing a processor based device having a processor that controls an electrical load, such as a motor.

In accordance with preferred embodiments, the method preferably comprises initiating operational control of the electrical load with startup code executed by the processor.

Processor control is subsequently released so that the electrical load operates in an open control mode while the startup code is displaced with application code. That is, a short blackout period is enacted during which processor control functions are suspended and the processor undergoes a "brain transplant" code swapping operation. The load continues to operate during the blackout period using settings established by the processor prior to blackout.

Processor operational control of the load is then resumed using the application code, and the device enters a normal operational mode.

Preferably, the startup code is supplied from a boot read only memory (ROM), and the controlling step comprises loading the startup code into a first memory location accessed by the processor. The controlling step further preferably comprises loading the application code into a second memory location accessible by the processor.

The electrical load preferably comprises a spindle motor that supports a data storage medium, so that the controlling step comprises using the motor to rotate the data storage medium at an operational velocity and retrieving the application code from the rotating data storage medium.

Consistent with the foregoing discussion, the apparatus preferably comprises an electrical load, a memory location, and a programmable processor coupled to the memory location and adapted to control the load.

During an initialization process, the processor executes startup code loaded into the memory location to initiate operational control of the load, temporarily releases operational control of the electrical load so that the electrical load continues to operate in an open control mode while the startup code in the memory location is displaced with application code, and then resumes operational control of the electrical load using the application code.

In this way, the time required to place the device into an operational ready mode is significantly reduced. Subsequent modifications to the application code and/or the startup code are less likely to interfere with the initialization process, since an abrupt brain transplant operation is carried out in lieu of a prolonged handshaking approach wherein the startup code is gradually phased out and the application code is gradually phased in while attempting to maintain processor control of the operating load.

These and various other features and advantages that characterize the claimed invention will be apparent upon reading the following detailed description and upon review of the associated drawings.

DETAILED DESCRIPTION

Figure 1:
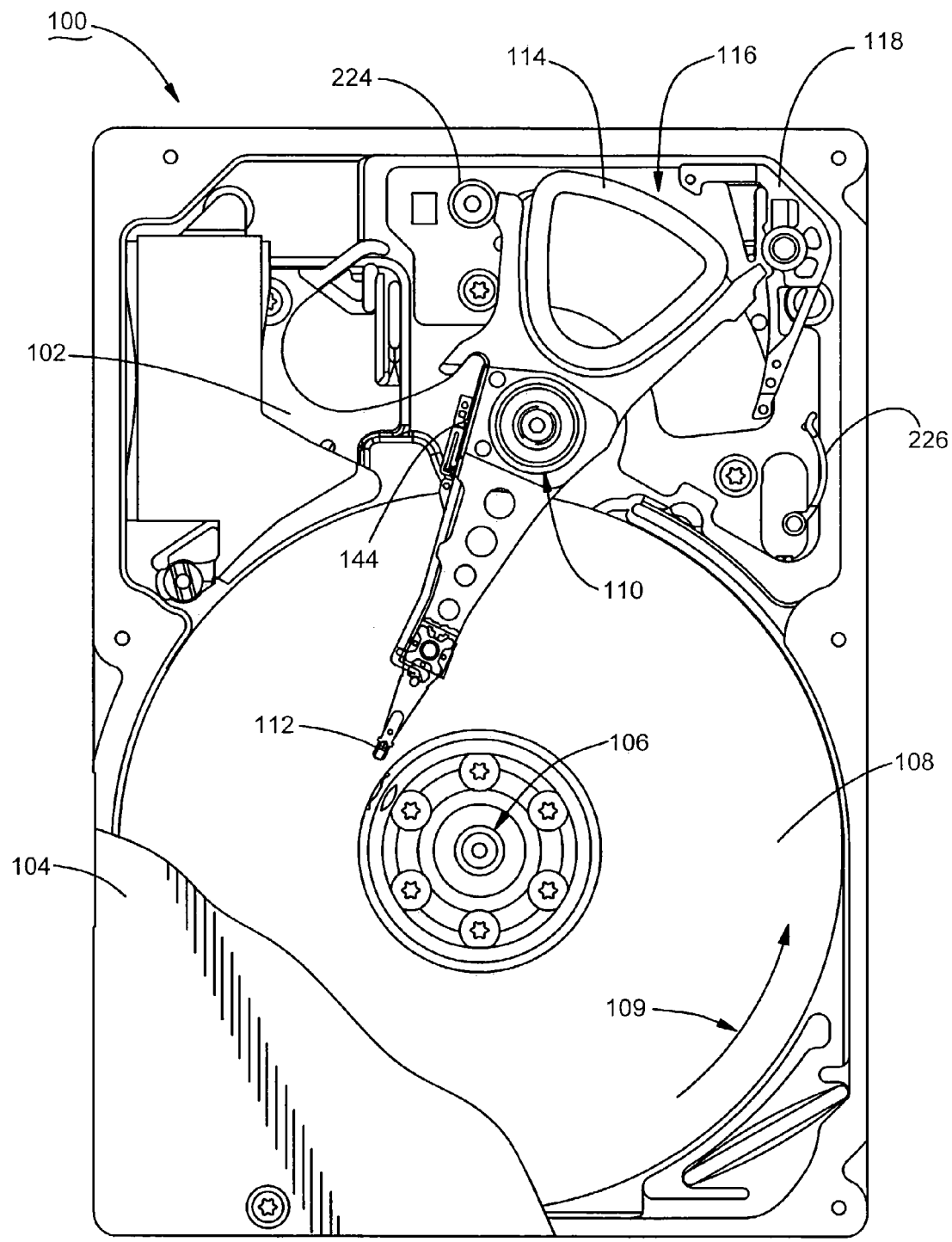
FIG. 1 is a top plan view of an exemplary data storage device constructed and operated in accordance with preferred embodiments of the present invention.

To provide an illustrative environment in which various preferred embodiments of the present invention can be advantageously practiced, FIG. 1 provides a top plan view of a data storage device 100 of the type used to store digital data.

The data storage device 100 includes a head/disc assembly (HDA) 101 comprising substantially all of the active mechanical components of the device 100. A printed circuit board, PCB (mounted to the underside of the HDA 101 and thus not visible in FIG. 1) houses communication and control electronics for the device.

The HDA 101 includes a rigid base deck 102 which cooperates with a top cover 104 (shown in partial cutaway) to form a sealed housing. A spindle motor 106 is mounted within the housing to rotate one or more data storage discs 108 at a constant high speed in rotational direction 109. A rotary actuator assembly 110 supports a corresponding array of data transducing heads 112 used to write data to and read data from concentric tracks defined on the disc surfaces.

The heads 112 are moved across the disc surfaces by the controlled application of current to a coil 114 of a voice coil motor (VCM) 116. When the device 100 is deactivated, the heads 112 come to rest on texturized landing zones located near the innermost diameters of the discs 108, and the actuator is latched using a magnetic toggle latch 118.

Figure 2:
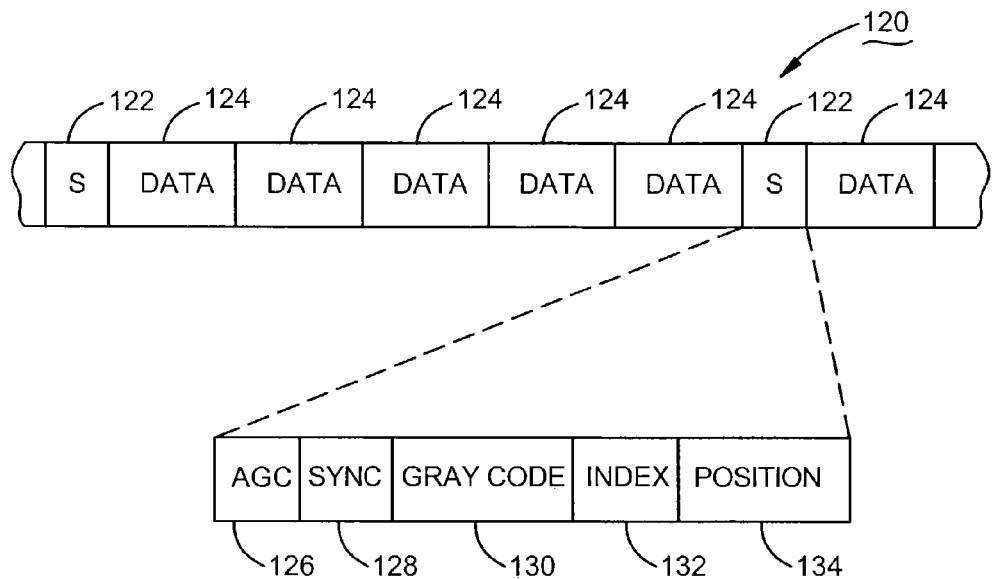
FIG. 2 illustrates the manner in which data are formatted on tracks of the disc recording surfaces of FIG. 1.

FIG. 2 generally illustrates the manner in which data are arranged on the disc surfaces. The tracks (numerically designated at 120) include servo data fields 122 (servo sectors) which store servo control data used to provide positional control of the heads 112. User data fields 124 (data sectors) are formatted in the areas between adjacent servo data fields 122, and are used to store user data in fixed sized blocks, such as 512 bytes.

As each track 120 includes both servo sectors 122 and data sectors 124, the device 100 employs what is referred to as an embedded servo scheme. It will be contemplated that there are 200 such servo sectors 122 on each track, so that a selected head 112 following the track 120 in FIG. 2 will encounter 200 servo sectors 122 over each revolution of the disc 108.

The format of the servo sectors 122 will depend in part upon the specific configuration of the drive electronics. An exemplary format is shown in FIG. 2 to include an automatic gain control (AGC) field 126, a synchronization (sync) field 127, a Gray code (track address) field 128, an index (timing mark) field 129 and a position field 130.

The AGC field 126 includes an oscillating (2T) pattern used to set the gain to normalize readback signals for remaining portions of the servo sector 122. The sync field 127 is a unique pattern the detection of which indicates the presence of the servo sector 122. The Gray code field 128 provides a track address (radial position), the index field 129 indicates angular position with respect to an index position (zero angular degrees) and the position field 130 provides intra-track positioning information.

Figure 3:
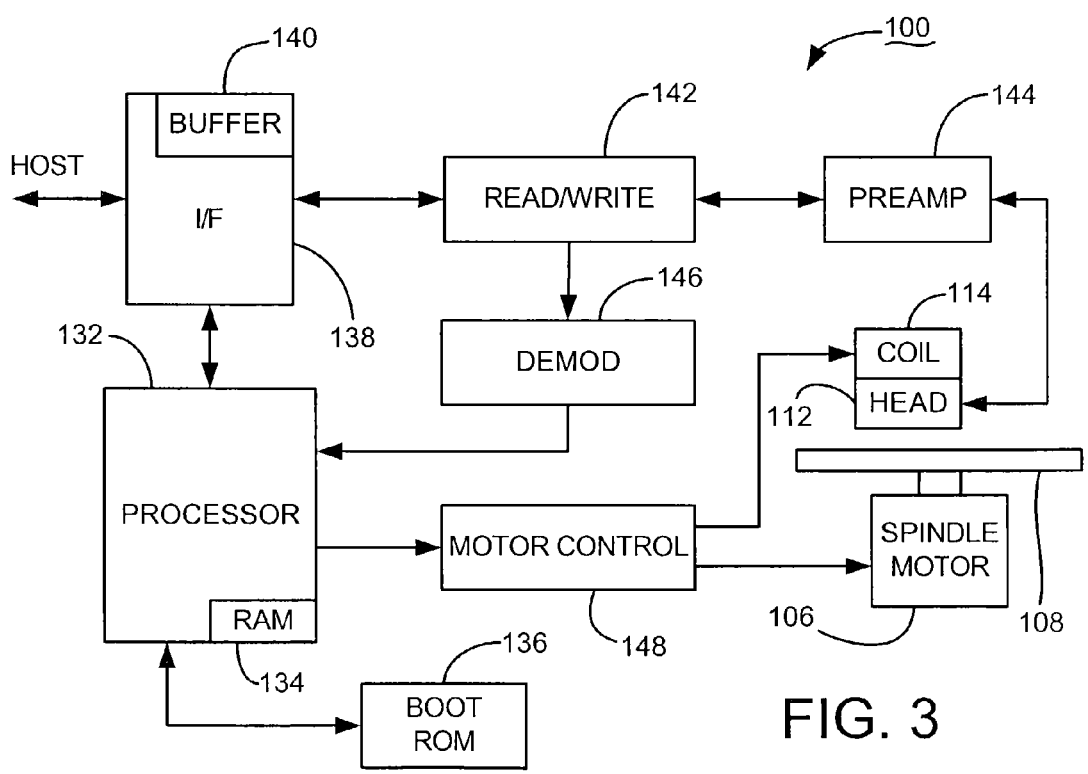
FIG. 3 provides an overall functional block diagram of the device of FIG. 1.

FIG. 3 shows a functional block diagram for the device 100. Top level control is provided by a programmable processor 132. The processor 132 includes a relatively small, tightly-coupled random access memory (RAM) 134 that executes at the processor internal bus clock rate. A separate boot read only memory (ROM) device 136 provides startup code used during initialization of the device 100.

A hardware interface (P/F) block 138 communicates with a host device (not shown) and includes a buffer 140 comprising a memory space to accommodate the temporary storage of data during transfer operations between the host and the discs 108. The buffer 140 also stores application code utilized during normal operation of the device 100. The application code is retrieved from the discs 108 and loaded into the buffer 140 during the initialization process.

Before discussing preferred methodologies for loading and using the startup code and the application code, it will be helpful to briefly review additional aspects of the device 100. FIG. 3 shows the device 100 to further include a read/write channel 142, which encodes data to be written to the discs 108 and decodes data retrieved from the discs 108. The read/write channel 142 operates in conjunction with a preamplifier/driver circuit (preamp) 144, which applies write current signals to the heads 112 during a write operation and preamplifies readback signals from the heads 112 during a read operation. The preamp 144 is preferably mounted to the actuator 110, as shown in FIG. 1.

A demodulation (demod) circuit conditions readback signals from the servo sectors 122 (FIG. 2). A motor control circuit 148 is controlled by the processor 132 to provide control signals to the actuator coil 114 of the VCM 116 and the spindle motor 106.

Figure 4:
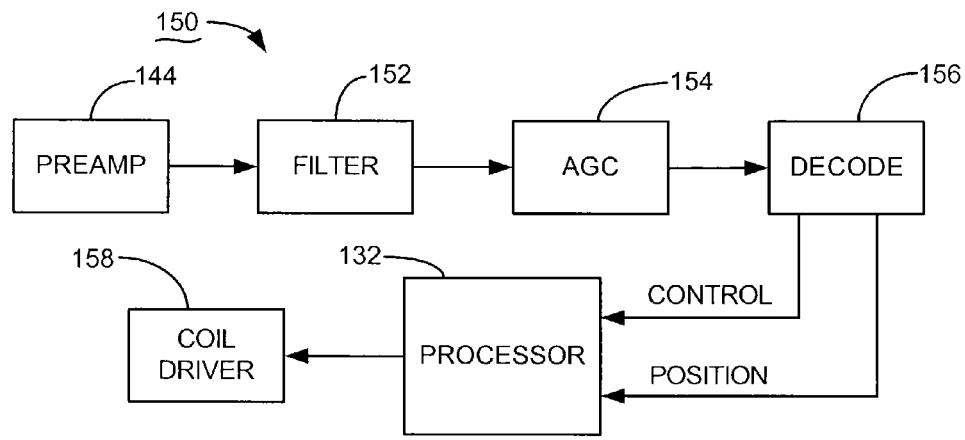
FIG. 4 is a functional block diagram of a servo control circuit used to provide positional control of a voice coil motor (VCM) of the device of FIG. 1, the VCM moving data transducing heads to the various tracks of FIG. 2.

FIG. 4 generally illustrates a servo loop 150 established by the circuitry of FIG. 3 to provide head positional control. The servo data from the servo sectors 122 are transduced by the selected head 112 to generate servo readback signals. The signals are preamplified by the preamp 144, adaptively filtered by filter block 152, normalized by AGC block 154 and supplied to a decode block 156.

The decode block 156 includes a hardware manager and registers that operate to provide the processor 132 with servo control data and position data from the processed servo readback signals. The servo control data provide disc surface coordinate information (i.e., track address, angular position, sectors to go until index, etc.) from the GC and index fields 130, 132. The position data identify the position of the head 112 with respect to track width (e.g., +10% of track width from track center, etc.) using the position fields 134. With reference back to FIG. 3, the filter 152 and the AGC 154 form portions of the read/write channel 142, and the decode block 156 is incorporated in the demod circuit 146.

The processor 132 outputs current command signals to a coil driver circuit 158. The coil driver circuit 158 forms a portion of the motor control block 148 and preferably incorporates an H-bridge driver configuration as shown in FIG. 5.

Figure 5:
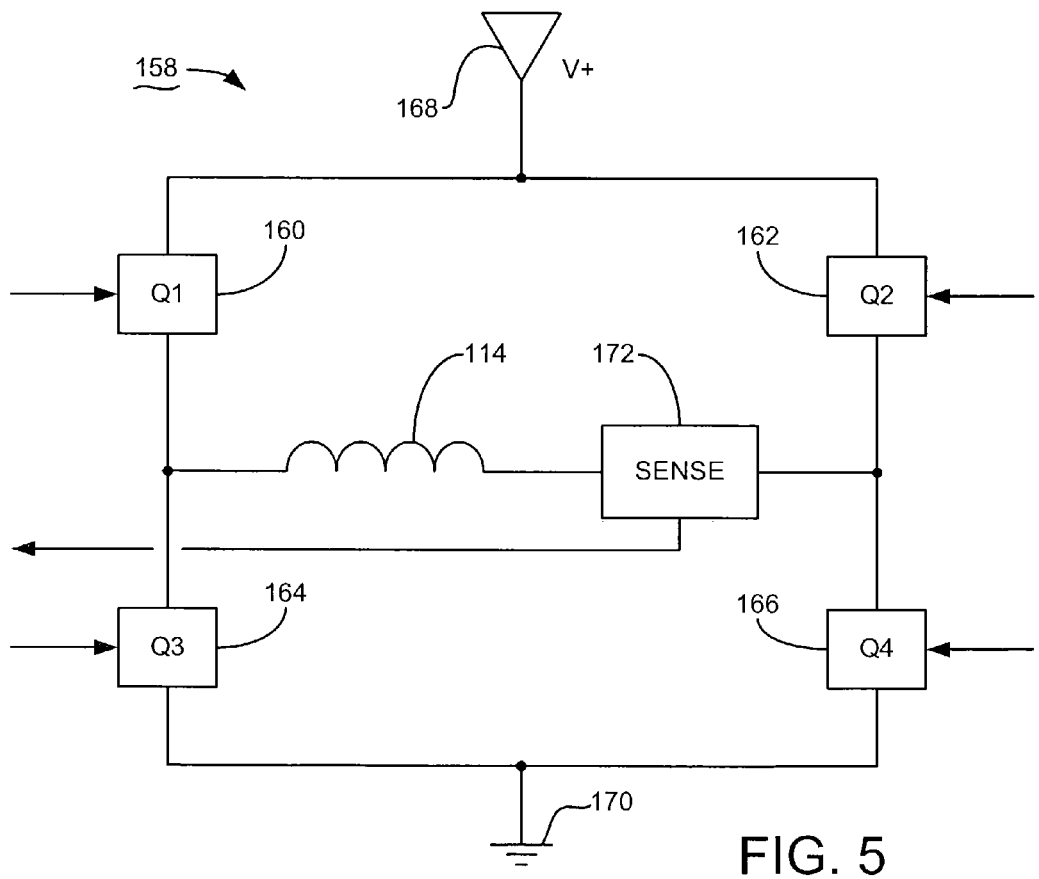
FIG. 5 provides a schematic representation of a VCM driver circuit of FIG. 4.

More particularly, FIG. 5 shows the driver circuit to include Q1-Q4 switching elements 160, 162, 164, 166 preferably comprising MOSFETs) arranged between a V+ voltage source 168 and ground terminal 170. The controlled activation of Q1 and Q4 elements 160, 166 results in the flow of current through the actuator coil 114 in a first direction, while the controlled activation of Q2 and Q3 elements 162, 164 results in a flow of current in the opposite direction. A current sense module 172 (preferably comprising a sense resistor) provides an indication of the amount of current flowing through the coil 114 via path 174.

Figure 6:
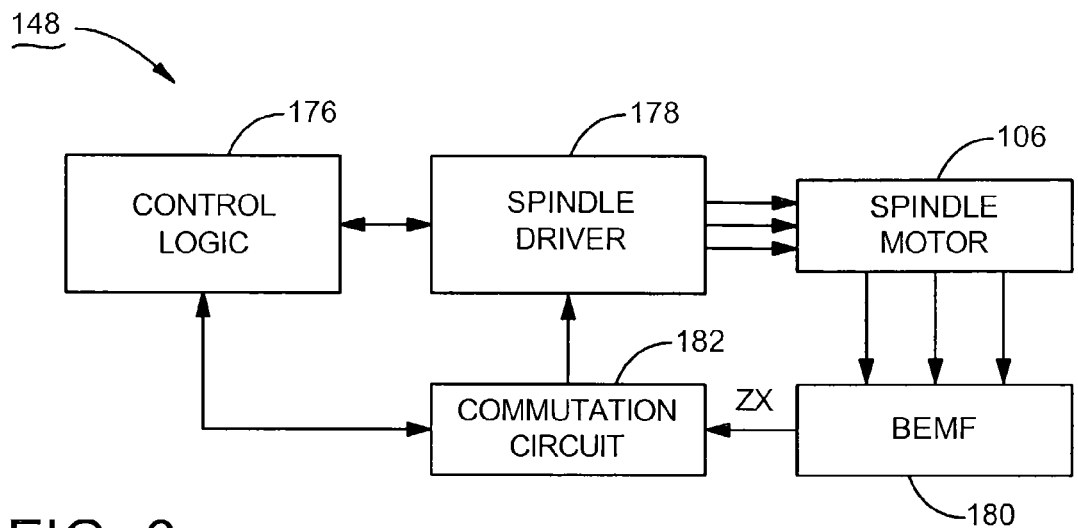
FIG. 6 is a functional block diagram of a motor control circuit used to provide rotational control of a spindle motor of the device of FIG. 1, the spindle motor rotating the disc recording surfaces of FIG. 2.

FIG. 6 provides a functional block diagram of relevant portions of the motor control block 148 (FIG. 3) used to electrically commutate the spindle motor 106. Control logic 176 communicates with the processor 132 and commands a given rotational speed for the motor 106. A spindle driver 178 applies drive pulses to the motor 106, and a back electromotive force (bemf) detection circuit 180 detects bemf generated by the rotation of the motor.

The bemf detection circuit outputs zero crossing (ZX) signals to a commutation circuit 182 when the voltage on selected phases of the motor 106 cross over the voltage at a center tap of the motor. The commutation circuit 182 applies commutation timing signals to the spindle driver 178 to time the application of each subsequent drive pulse.

Figure 7:
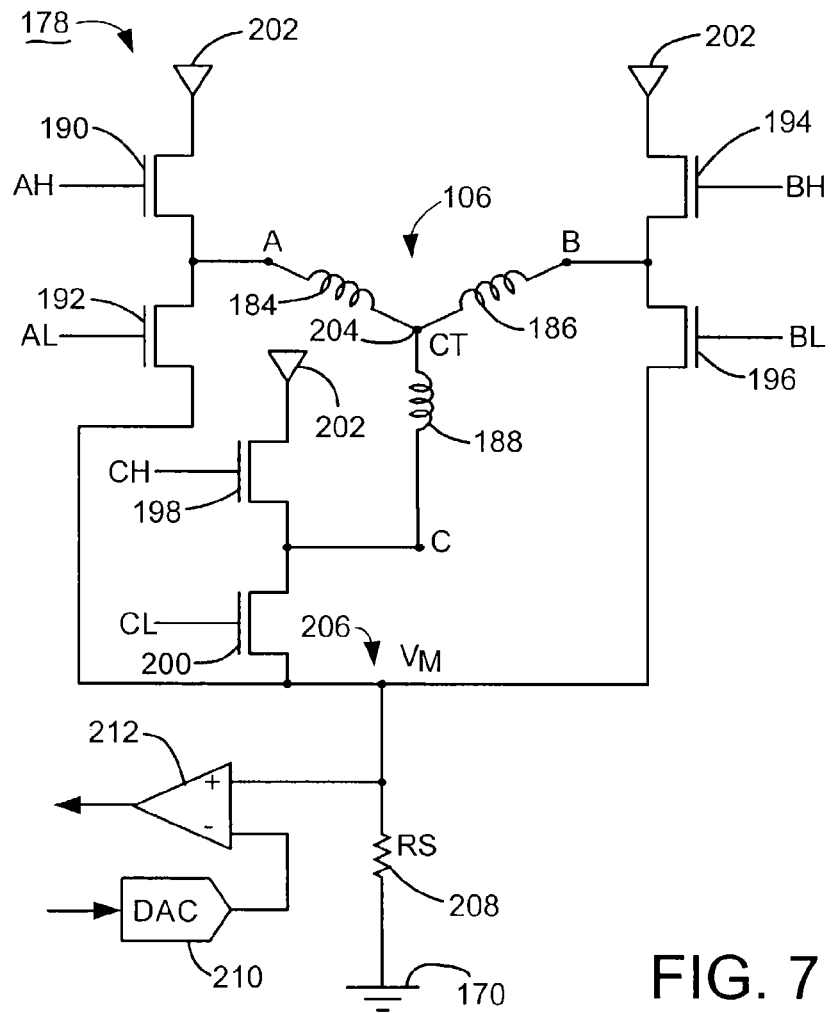
FIG. 7 provides a schematic representation of a spindle motor driver circuit of FIG. 6.

FIG. 7 shows relevant portions of the spindle driver circuit 178 and spindle motor 106 in greater detail. The spindle motor 106 is shown to be a three-phase inductive motor with A, B and C phase windings 184, 186, 188. Switching devices (preferably MOSFETs) 190, 192, 194, 196, 198, 200 are connected to the A, B and C phase windings and are identified as AH (phase A high-side), AL (phase A low-side), BH, BL, CH and CL, respectively.

The switching devices are selectively engaged in turn to cause current to flow from a voltage source 202 into a first phase, through a center tap (CT) node 204 and out a second phase to a motor voltage sense node (VM) 206, across a sense resistor (RS) 208 and to ground terminal 170.

The magnitude of each current pulse is controlled by an input current limit value supplied by the control logic to a digital to analog converter (DAC) 210. The DAC 210 converts this value to an analog voltage which is supplied to a negative input terminal of operational amplifier (opamp) 212. The voltage at VM node 206 is supplied to a positive input terminal of the opamp 212. The low side switching device (e.g., AL, BL or CL MOSFET 192, 196, 200) during a given commutation state is modulated to maintain the voltage at the VM node 206 nominally equal to the reference voltage supplied by the DAC 210.

Preferably, acceleration of the spindle motor 106 includes steps of detecting the initial state of the motor, and then applying short duration pulses to accelerate the motor 106 until an intermediate velocity is reached. The intermediate velocity comprises a velocity at which bemf generated by the spindle motor 106 at a sufficient level so as to be readily detected by the bemf detection circuitry 180. An exemplary intermediate velocity may be around 1,000 rpm, depending upon the construction of the spindle motor 106.

At this point a handoff is made to the bemf detection circuitry 180 and the commutation circuit 182 to electrically commutate the motor until the final operational velocity is nominally reached (e.g., 10,000 rpm). This latter acceleration phase is preferably carried out using a table of current limit values that are sequentially applied to the DAC 210 by the control logic 176. The current limit values are successively decreased as the motor velocity increases until the final operational velocity is reached.

As the motor 106 approaches the operational velocity, the processor 132 switches to what is sometimes referred to as sensor based motor speed control. This is a control mode whereby the velocity of the motor 106 is continually measured in relation to the rate of receipt of the zero crossing (ZX) pulses. The current limit values supplied to the DAC 210 are adjusted in relation to the measured velocity to nominally reach and maintain the motor 106 at the operational velocity.

Finally, the processor 132 commands a switchover to what is referred to as embedded motor speed control, which is the control mode carried out during normal read and write operations of the device 100. Embedded motor speed control generally provides a higher level of accuracy over sensor based mode control, and involves the synchronization (frequency locking) of the spindle motor to the timing marks in the servo sectors 122.

That is, during embedded motor speed control the velocity of the motor 106 is determined in relation to the rate at which the timing marks are detected (200 per revolution in the present example). Appropriate current limit values are continuously supplied to the DAC 210 in relation to the detected velocity of the motor 106 from the timing marks. Embedded speed control thus includes operation on the part of the processor 132 to provide the timing mark information from the servo loop 150 to the control logic block 176 of the spindle motor control circuitry.

Having now concluded an overview of relevant portions of the device 100, preferred methodologies for the initialization of the device 100 will now be discussed. It will be readily apparent to those skilled in the art that the application code used to control the operation of the device 100 is relatively complex and can include one or more routines that concurrently control the operation of the spindle motor 106, the servo loop 150 and the read/write channel 142 to coordinate the transfer of data between the host and the discs 108.

While the application code could be stored in a separate non-volatile integrated circuit memory device, the presence of an existing, very large non-volatile memory space (i.e., the disc recording surfaces) can be used to store at least portions of the application code (including adaptive operational parameters) in the data sectors 124 on guard tracks outside the user-accessible recording areas of the disc surfaces.

While advantageously reducing parts counts and unit costs, such a scheme uses the startup sequence to energize the spindle motor 106 and the VCM 116, move the appropriate head or heads 112 to the guard tracks, and retrieve the application code to the buffer 140.

It will be noted that such schemes should carefully transition control of the various operating subsystems (servo control, spindle motor control, read/write channel control, etc.) from the startup code to the application code without adversely affecting the operation of the device 1 00. Preferably, such scheme also should ensure that subsequent upgrades to the startup code and/or the application code maintain the necessary compatibility between these respective code sets to prevent a failure condition (a "crash") in the device during the initialization process.

Accordingly, preferred embodiments of the present invention provide a novel initialization approach that is descriptively referred to as a "brain transplant" technique. Instead of maintaining processor control of the active subsystems (electrical loads) while phasing out the startup code and phasing in the application code, the transplant approach generally involves establishing a short "blackout" period during which processor control is released, the spindle motor 106 and the VCM 116 are left operating in an open control mode, and the respective code systems are quickly swapped. Such a sequence is generally represented by FIG. 8.

Figure 8:
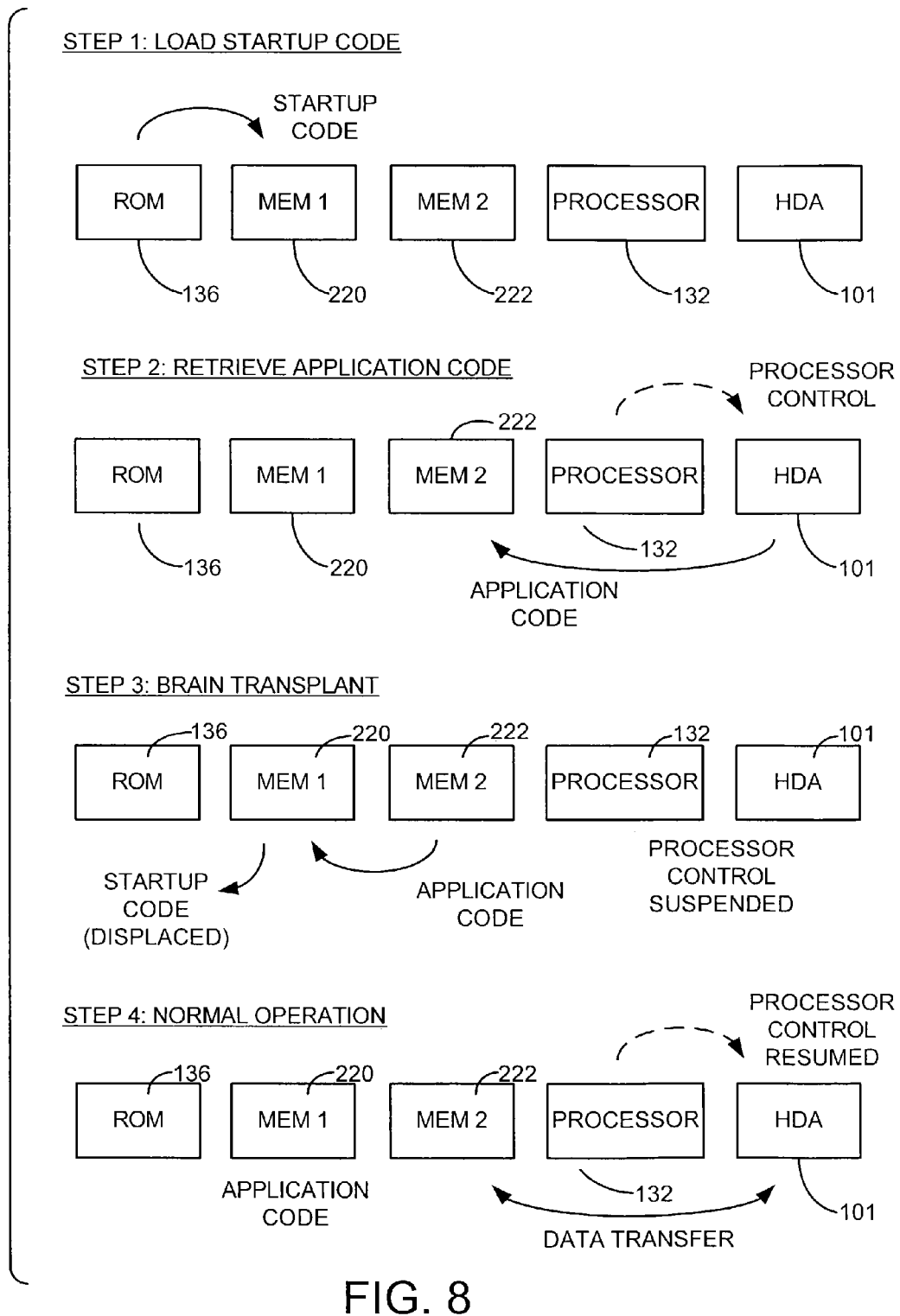
FIG. 8 is a timing block diagram to generally illustrate preferred steps whereby the device of FIG. 1 transitions from startup code to application code during an initialization process.

As shown by Step 1 in FIG. 8, upon receipt of a command to initialize the device 100, the startup code resident in the boot ROM 136 is loaded into a first memory location 220. This first memory location, MEM 1, represents a memory space that is used to supply the instructions executed by the processor 132; in other words, the processor 132 is configured to execute whatever is loaded into MEM 1.

The physical embodiment of the MEM 1 location 220 will vary depending on the hardware configuration of the device 100 as well as the code itself; for purposes of the presently discussed embodiment, with reference again to FIG. 3 it will be contemplated that the MEM 1 location 220 preferably includes portions of the tightly-coupled RAM 134 and the buffer 140, but is not so limited.

During step 2 in FIG. 8, the startup code is sequentially executed by the processor 132. Resulting operations can include an initialization of various electronic components, a spinup operation whereby the motor control circuit 148 is instructed to accelerate the discs 108 to the-operational velocity, and movement of the heads 112 out over the disc recording surfaces by the servo loop 150. The heads 112 are moved to the associated guard tracks and the application code is transferred (via preamp 144 and read/write channel 142) to a second memory location 222 (MEM 2) of the device 100.

The MEM 2 location 222 preferably represents a staging area where code can be stored but not necessarily executed by the processor; thus, MEM 2 represents a location where code can be temporarily stored pending transfer to MEM 1. Preferably, the MEM 2 location 222 represents portions of the buffer 140, although this is not limiting. As shown in FIG. 8, the HDA 101 is under processor control (via the startup code) during Step 2.

Because of programming space constraints, the startup code preferably is configured to provide sufficient control of the servo and spindle control circuits to successfully transfer the application code to the MEM 2 location 222, but may not include all of the available adaptive features and aspects (e.g., adaptive parameters of the filter 152, FIG. 4) that are employed during normal operation.

Once the application code has been successfully loaded into the MEM 2 location 222, the sequence moves to Step 3, wherein the brain transplant operation occurs. Generally, during this step processor control of the HDA 10.1 is suspended (released), the application code (or at least an initial portion thereof) is moved to the MEM 1 location 220, and the startup code is displaced (removed, overwritten, or otherwise ignored) from the MEM 1 location.

Once the transfer of the application code to the MEM 1 location 220 is successfully completed, Step 4 of FIG. 8 commences with the resumption of processor control and the normal operation of the device under the control of the application code, including data transfer operations between the host and the discs 108. Step 4 continues until the device is deactivated, after which the foregoing steps are repeated upon receipt of the next initialization command.

It will be recognized based on the foregoing discussion that placing the spindle motor 106 and VCM 116 into a suspended processor control configuration, even for a short time, will likely result in some amount of spindle motor speed variation and VCM position drift. Position and timing synchronization may be lost and, if sufficient care is not taken, damage to the device I 00 may occur.

In preferred embodiments, the amount of speed variation in the spindle motor 106 during the blackout period is reduced by having the processor 132 load a predetermined current limit value to the DAC 210 (FIG. 7) and instructing the control logic block 148 (FIG. 6) to switch from embedded motor speed control to bemf-based commutation control of the motor 106.

This bemf-based commutation control relies on the gross detection of the zero crossing points to time the next commutation state transitions (i.e., the application of the next current pulses). Thus, motor speed will be maintained to a degree since the circuitry will adjust the timing of the pulses, but the magnitudes of the current pulses applied to the commutation states will generally remain fixed in relation to the pre-established current limit value.

In this way, spindle motor speed may drift during the blackout period by some amount (e.g., ±20% of nominal speed), but the motor will still be operating in a range sufficient to maintain the aerodynamic flight of the heads 112 and to enable a relatively fast re-synchronization with the servo timing marks after processor control is resumed.

Preventing or reducing VCM drift is preferably carried out in a number of alternative ways. In one preferred approach, just before disengagement of the processor the average amount of bias current being applied at that point to nominally maintain the selected head 112 over the corresponding guard band track is determined. The processor 132 then commands this value to the coil driver 158 (FIG. 4) so that this same amount of current continues to be supplied to the coil 114 while the processor is temporarily disengaged.

In another approach, just before disengagement of the processor 132 a seek operation is commanded to move the actuator 110 against an inner or outer limit stop (mechanisms used to limit the stroke of the actuator 110 as shown at 224, 226 in FIG. 1). The processor 132 then commands a modest current value with an appropriate orientation so that the actuator 110 remains safely biased against the selected limit stop 224, 226 by the applied current.

In another alternative approach, the actuator 110 is moved to an area across the discs 108 previously determined to have little or no bias forces (due to flex circuit or windage effects), and either little or no current is applied to the coil 114 so that the heads 112 remain in the same general vicinity during the black out period.

In a worst case scenario, the actuator 110 is commanded to park the heads (such as on the landing zones in FIG. 1 at the innermost diameters of the discs 108 or on a ramp loading system at the outermost diameters of the discs) and the actuator 110 is securely latched with the latch 118. Parking the heads 112 and latching the actuator 110 substantially guarantees that the actuator 110 will not drift during the blackout period, but does increase the time to place the device 100 in the final operational ready state upon resumption of processor control.

Regardless of the particular alternatives that are selected to effect open mode control, it will be noted that the spindle motor 106 and the VCM 116 continue to operate during the blackout period, but without processor intervention. This allows the code swap to occur quickly without the need to perform processor operational commands for the rest of the device 100 until after the swap is completed.

It will be noted that the startup code is configured to place the various electrical loads in the aforedesrcribed open control mode as the substantially finals. executed steps of the startup code. The last instruction of the startup code preferably instructs the processor 132 to perform the code swap and execute the first instruction of the loaded application code.

The initial instructions of the loaded application code operate to enable the processor to quickly resume control of the electrical loads. While the particular steps will depend upon the configuration of the device 100, in a preferred embodiment the application code generally first instructs the spindle motor control circuitry 148 to resume sensor based motor speed control.

This results in the control logic block 176 determining the actual motor velocity in relation to the zero crossing (ZX) signals from the bemf detection circuitry 180 and adjusting the DAC 210 to bring the motor velocity back up to a value approximating the operational velocity.

Next, the servo loop 150 initiates a synchronization of the demodulation circuit 146 (a "demod sync"), which involves decoding the Gray code (track address) and the timing marks to acquire and thereafter continually track the radial and angular position of the selected head with respect to the associated disc 108. More particularly, the demod sync operation enables the servo loop hardware to locate (and thereafter track) the head 112 with respect to the associated disc 108.

When the blackout period involves parking the actuator 110 or biasing the actuator against one of the limit stops 224, 226, it may be necessary to first advance the heads 112 out over the disc recording surfaces in order to allow the servo loop 150 to begin transducing the servo sectors 122 on the disc 108.

Depending upon the configuration of the device 100, it may take multiple revolutions of the discs 108 and the successful detection of multiple index positions before the demod sync operation is declared successful. In the meantime, after the detection of just a few timing marks, an accurate determination of the existing rotational velocity of the motor 106 can be achieved. Thus, the processor switches over to embedded motor based control during the demod sync operation.

Finally, once both the motor control circuitry 148 indicates that both the spindle motor 106 and VCM 116 have acquired synchronization and are in a ready state, the processor proceeds with remaining portions of the application code and the device 100 enters normal operation (step 4 of FIG. 8).

Assuming that the code swap can be carried out in around 0.5 milliseconds, ms ($0.5 \times 10^{-3}$ seconds), and the demod sync operation can be successfully carried out in around another 24.5 ms (i.e., a little over four revolutions of the discs 108 at a rotational speed of 10,000 rpm, or about 6 ms/rev), the total transition from startup to application code can be completed in about 25 ms. This has been found to be one or more orders of magnitude faster than existing phased-in code swapping approaches that attempt to maintain processor control throughout, and represents significant reductions in overall device initialization time.

Figure 9:
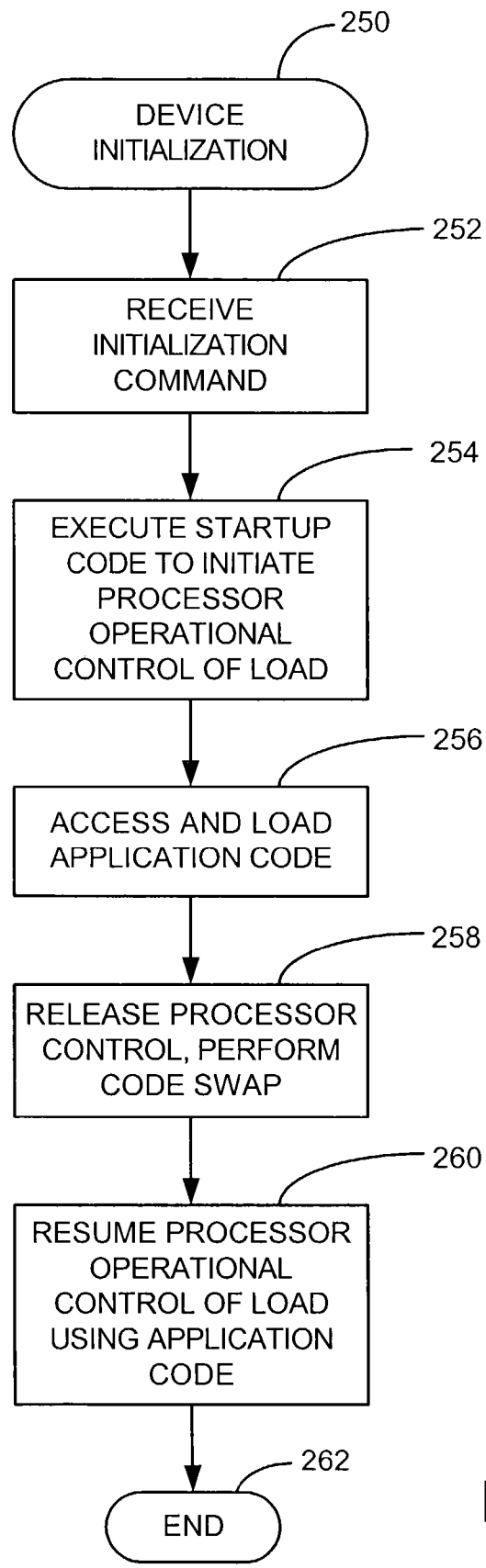
FIG. 9 is a flow chart for a DEVICE INITIALIZATION routine, generally representative of steps carried out in accordance with preferred embodiments of the present invention.

FIG. 9 provides a flow chart for a DEVICE INITIALIZATION routine 250, generally representative of steps carried out in accordance with preferred embodiments of the present invention to initialize the device 100. It is understood that the device 100 is initially in a deactivated state (i.e., in a turned-off or powered down sleep mode).

At step 252, an initialization command is received, resulting in the loading and execution of the startup code (from ROM 136 to MEM 1, FIG. 8) by the processor 132.

During the execution of the startup code, as shown by step 254, the processor 132 initiates processor controlled operation of one or more electrical loads of the device (in this case the spindle motor 106, the VCM 116, the associated control circuitry 148, the read/write channel 142, etc.).

At step 256, the application code is preferably accessed and loaded into a second memory location (MEM 2, FIG. 8) pending transfer. At step 258, processor control of the electrical load(s) is released, preferably as discussed above, while the startup code is displaced by the application code. Finally, at step 260 processor control of the electrical load(s) is resumed using the loaded application code and the device enters normal operation. The process thereafter ends at step 262.

While presently preferred embodiments have been directed to a data storage device, the present invention as claimed below is riot necessarily so limited. Rather, any number of different types of processor based devices that utilize electrical loads that are controlled by the processor (such as lasers or other light sources, robotic systems, capacitive and inductive charging systems, other types of motor based systems, etc.) are contemplated as being well within the scope of the present disclosure.

It will now be understood that the present invention (as embodied herein and as claimed below) is generally directed to a method and apparatus for initializing a processor based device 100 having a processor 132 that controls an electrical load, such as a motor 106, 116.

In accordance with preferred embodiments, the method preferably comprises controlling the electrical load with startup code executed by the processor. Processor control is next released so that the electrical load operates in an open control mode while the startup code is displaced with application code. Processor control of the electrical load is then reinstated using the application code.

Preferably, the startup code is supplied from a boot read only memory (ROM) 136, and the controlling step comprises loading the startup code into a first memory location 220 accessed by the processor. Moreover, the controlling step further preferably comprises loading the application code into a second memory location 222 accessible by the processor.

The electrical load preferably comprises a spindle motor 106 that supports a data storage medium 108, so that the controlling step comprises using the motor to rotate the data storage medium at an operational velocity and retrieving the application code from the rotating data storage medium.

The apparatus preferably comprises an electrical load 106, 116, a memory location 134, 140, 220, and a programmable processor 132 coupled to the memory location and adapted to control the electrical load During an initialization process 250 the processor executes startup code loaded into the memory location to initiate operational control of the load, temporarily releases operational control of the electrical load so that the electrical load continues to operate in an open control mode while the startup code in the memory location is displaced with application code, and resumes operational control of the electrical load using the application code.

For purposes of the appended claims and consistent with the foregoing discussion, the term "open control mode" will be understood to include a mode of operation whereby the electrical load continues to operate using settings established by the processor prior to the release of processor control and without further processor regulation or intervention, a mode that is not under processor control or simply a mode that is not under any control.

The term "operational control" will be understood to include a mode of operation whereby the processor engages in continual active regulation, intervention or verification to maintain the continued operation of the load, or simply a mode where the processor controls the load.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method, comprising:
controlling an electrical load with a first code executed by a processor;
releasing processor control so that the electrical load operates in an open control mode while the first code is displaced with a second code; and
reinstating processor control of the electrical load using the second code.

2. The method of claim 1, wherein the first code of the controlling step is supplied from a boot read only memory (ROM).

3. The method of claim 1, wherein the controlling step comprises loading the first code into a first memory location accessed by the processor.

4. The method of claim 3, wherein the controlling step further comprises loading the second code into a second memory location accessible by the processor.

5. The method of claim 4, wherein the releasing step comprises moving the second code from the second memory location into the first memory location, thereby displacing the first code from the first memory location.

6. The method of claim 1, wherein the electrical load is a motor.

7. The method of claim 6, wherein the motor supports a data storage medium, and wherein the controlling step comprises using the motor to rotate the data storage medium at an operational velocity and retrieving the second code from the rotating data storage medium.

8. The method of claim 1 wherein the processor operationally controls the electrical load.

9. The method of claim 1, wherein at least one control signal is applied to the electrical load during the open control mode of the releasing step.

10. A method, comprising:
using a processor to execute startup code loaded into a memory location to initiate operational control of an electrical load;
continuing to operate the electrical load while processor operational control of the electrical load is temporarily suspended to load application code to the memory location; and
resuming operational control of the electrical load using the application code.

11. The method of claim 10, wherein the startup code of the using step is supplied from a boot read only memory (ROM).

12. The method of claim 10, wherein the memory location of the using step is characterized as a first memory location, and wherein the using step further comprises loading the application code into a second memory location accessible by the processor.

13. The method of claim 12, wherein the continuing step comprises moving the application code from the second memory location into the first memory location, thereby displacing the startup code from the first memory location.

14. The method of claim 10, wherein the electrical load comprises a motor supporting a data storage medium, and wherein the using step comprises energizing the motor to rotate the data storage medium at an operational velocity and retrieving the application code from the rotating data storage medium.

15. The method of claim 14, wherein the using step further comprises using the startup code to energize an actuator motor to bring a data transducing head into alignment with a track defined on the data storage medium, and utilizing the head to transduce the application data from said track.

16. An apparatus, comprising:
an electrical load;
a memory location; and
a programmable processor coupled to the memory location and adapted to control the electrical load, wherein during an initialization process the processor executes startup code loaded into the memory location to initiate operational control of the load, temporarily releases operational control of the electrical load so that the electrical load continues to operate in an open control mode while application code is loaded to the memory location, and resumes operational control of the electrical load using the application code.

17. The apparatus of claim 16, further comprising a boot read only memory (ROM) which stores the startup code, wherein the startup code is loaded from the boot ROM to the memory location for execution by the processor.

18. The apparatus of claim 16, wherein the memory location of the using step is characterized as a first memory location, and wherein the apparatus further comprises a second memory location accessible by the processor and into which the processor loads the application code.

19. The apparatus of claim 16, wherein the electrical load comprises a motor supporting a data storage medium, and wherein the execution of the startup code by the processor results in the energizing of the motor to rotate the data storage medium at an operational velocity.

20. The apparatus of claim 19, further comprising an actuator motor coupled to a data transducing head, and wherein the execution of the startup code by the processor further results in the energizing of the actuator motor to bring the head into alignment with a track defined on the data storage medium, the head transducing the application data from said track.

* * * * *